Wyckoff & Stevens,
Hollow Auger.

№ 31,694. Patented Mar. 12, 1861.

Witnesses:
S. J. Allis
J. H. Woods

Inventors:
Arcalous Wyckoff
La Fayette Stevens
By their Attorney, J. Fraser

UNITED STATES PATENT OFFICE.

A. WYCKOFF AND L. STEVENS, OF ELMIRA, NEW YORK; SAID STEVENS ASSIGNOR TO SAID WYCKOFF.

HOLLOW AUGER.

Specification of Letters Patent No. 31,694, dated March 12, 1861.

*To all whom it may concern:*

Be it known that we, ARCALOUS WYCKOFF and LA FAYETTE STEVENS, both of Elmira, in the county of Chemung and State of New York, have invented a new and Improved Method of Constructing the Heads of Annular Augers; and we do hereby declare that the following is a full and exact description thereof, reference being had to the accompanying drawings, making part of this specification, in which—

Figure 3:
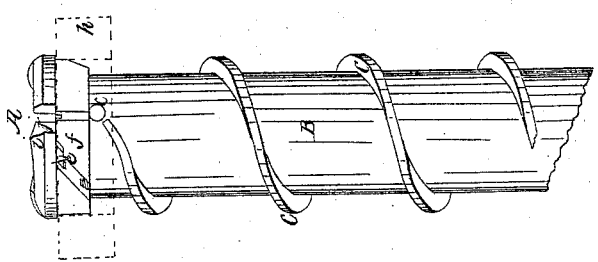
Figure 2:
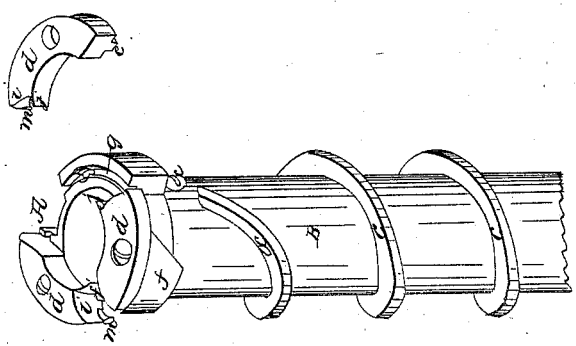
Figure 1:
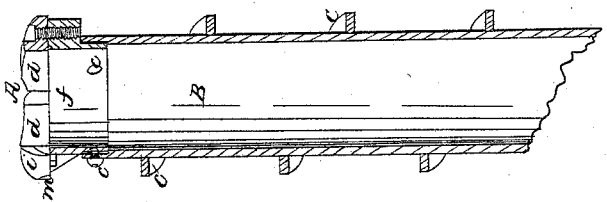

Figure 1 is a longitudinal section through the head and a portion of the stock of one of our improved augers. Fig. 2 is a perspective view of the head, one of the cutters being shown detached, $d'$. Fig. 3 is an elevation of the head and portion of the stock.

Like letters designate corresponding parts in all of the figures.

Our improvements relate to that class of augers which have a rod or core, by removing only an annular portion of the wood.

They generally consist, as represented in the drawings, of a head or cutting portion A, attached to the tube or stock B, which may be of any length that can be conveniently operated, and to the opposite end of which the driving power is applied, and the worm C, for removing the chips as they are formed. As these augers are often required of large capacity,—such as will form a bore of from three to twenty inches in diameter, for use as wooden water pipes, the construction of the cutting portion becomes a matter of extreme difficulty on account of the springing and fracturing of the steel in tempering. Being a ring of unequal thickness the process of hardening is certain either to destroy the perfect form with which it left the lathe, and thereby render it useless, or crack it in some essential point. We obviate these difficulties in the following manner:—The cutting portion is turned in the lathe to the size and shape required, and finished so far as its form admits of finishing in the lathe. The exterior and interior peripheries of the ring are formed, and an annular fillet, or tongue, $e$, is turned on the back side of the ring, the purpose of which will be hereafter explained. It is then taken from the lathe and finished by cutting into several equal sections, $d\ d$, the number of which may be more or less, varying with the size of the auger. In the model three are represented. These pieces are then finished to the proper shape for cutting by filing, grinding, &c., when they are severally hardened for use, and from their form are not liable to receive injury by the process of tempering. An iron ring, $f$, has also to be provided, which can be formed entirely in the lathe, being turned thin at one end so as to enter the tube B, to which it is affixed, either by screws or rivets $c\ c$. The opposite end is formed with an annular groove, $g$, adapted to just receive the fillet, $e$, on the knives or cutting sections, which are inserted in that manner, and held by a screw in the center of each. This "tongue and groove" connection holds the several knife-sections immovably in their position, which cannot be other than true, as the groove in $f$ is formed in the lathe, and, as it requires no hardening, its form is not thereby rendered imperfect. The groove prevents the sections from turning on the screw which forms the center of each, while the screw prevents them from sliding in the groove under the resistance of cutting. The ring $f$ which thus forms the frame work of the cutters $d$ is made to answer another important purpose. It is made a little smaller in external diameter than the periphery of the cutters, as shown in Fig. 3, to form a bearing which runs in a box or rest. This ring is attached to the frame of the machine, and forms a support for the head of the auger, before it enters the wood. When the cutter head is buried in the wood, the ring is moved back by the feeding of the timber to the auger, as it is then no longer required, the auger forming its own bearings, which are both external and internal; the latter being on the core which it forms. The interior diameter of the ring $f$, is greater than that described by the cutters, to prevent friction on the core; and the tube B, is also large enough to allow it to pass through with ease.

In forming the cutting edges of the knives or sections $d$, the form of "prime and auxiliary transverse cutters," secured to Arcalous Wyckoff, one of the inventors hereof, by Letters Patent dated July 12th, 1859, is followed, and to which we have added an improvement. The cutting edge $i$ in our drawings is substantially the same as the prime cutter of the patent referred to, cutting by the rotation of the auger, while the auxiliary cutter *j* cuts by the feed of the auger, that is on a plane with the direction of the bore, and serves to smooth away the torn fibers left by the first cutters.

Our improvement consists in forming the prime cutters each with the terminal point *m*, projecting a little in advance of the edge *i*, and made somewhat thick and blunt. This serves to compress the grains of the wood while the cutters are acting, thereby preventing them from tearing up the fibers on the surface of the bore, and enabling the cutters to remove the chips with a smooth, clean cut. The effect is analogous to that of compressing a piece of cork, or other spongy material, to enable it to be cut more smoothly with a knife. This simple device admirably accomplishes the desirable result of dressing or shaving the interior of the bore perfectly smooth and free from fibers, as does the aforesaid patented invention the exterior of the core. The same effect may be accomplished though not in so complete a manner by bending in the thin edge or point of the cutter to prevent its cutting freely.

What we claim as our invention and desire to secure by Letters Patent is—

1. Constructing the cutter-head of annular augers by the combination of two rings, first, accurately fitted together by annular tongue and groove respectively on and in the adjacent surfaces thereof, and then by dividing one ring into sections or separate cutters *d, d*, and properly finishing and hardening them, while the other ring *f*, remains entire, and unchanged from its original accurate form, so that, upon attaching the sections to the entire ring, by screws or otherwise, unerring accuracy of form and perfection of parts are secured, substantially as herein specified.

2. The advance, blunt terminal point *m* of the prime cutter *i*, constructed and operating substantially in the manner and for the purpose herein shown and described.

ARCALOUS WYCKOFF.
LA FAYETTE STEVENS.

Witnesses:
L. B. SWAN,
A. I. SWAN.